(12) United States Patent
Nicholson et al.

(10) Patent No.: US 11,803,096 B2
(45) Date of Patent: Oct. 31, 2023

(54) FIBER-BASED SUPERCONTINUUM LIGHT SOURCE

(71) Applicant: OFS FITEL, LLC, Norcross, GA (US)

(72) Inventors: Jeffrey W Nicholson, Warren, NJ (US); Philip G Westergaard, Frederiksberg C (DK)

(73) Assignee: OFS FITEL, LLC, Norcross, GA (US)

( * ) Notice: Subject to any disclaimer, the term of this patent is extended or adjusted under 35 U.S.C. 154(b) by 240 days.

(21) Appl. No.: 17/288,984

(22) PCT Filed: Oct. 31, 2019

(86) PCT No.: PCT/US2019/059072
§ 371 (c)(1),
(2) Date: Apr. 27, 2021

(87) PCT Pub. No.: WO2020/092712
PCT Pub. Date: May 7, 2020

(65) Prior Publication Data
US 2021/0382372 A1      Dec. 9, 2021

Related U.S. Application Data

(60) Provisional application No. 62/754,095, filed on Nov. 1, 2018.

(51) Int. Cl.
*G02F 1/35* (2006.01)
*G02F 1/365* (2006.01)
(Continued)

(52) U.S. Cl.
CPC ............ *G02F 1/3528* (2021.01); *G02F 1/365* (2013.01); *H01S 3/06716* (2013.01); *H01S 3/1698* (2013.01)

(58) Field of Classification Search
CPC .... G02F 1/3528; G02F 1/365; H01S 3/06716; H01S 3/1698
See application file for complete search history.

(56) References Cited

U.S. PATENT DOCUMENTS 6,775,447 B2 * 8/2004 Nicholson .......... G02B 6/29377
372/21
6,925,237 B2 * 8/2005 Hebgen .............. G02B 6/03677
385/127

(Continued)

FOREIGN PATENT DOCUMENTS

| JP | 2008191370 | 8/2008 |
| JP | 2013205390 | 10/2013 |
| WO | WO 2013179492 | 12/2013 |

OTHER PUBLICATIONS

Liu et al., Self-phase modulation enabled, wavelength-tunable ultrafast fiber laser sources: an energy scalable approach, Opt. Express 24, 15328-15340 (2016). (Year: 2016).*

(Continued)

*Primary Examiner* — Peter Radkowski
(74) *Attorney, Agent, or Firm* — Wendy W. Koba, Esq.

(57) ABSTRACT

An all-fiber supercontinuum (SC) optical source utilizes a combination of a seed pulse supply of short-duration optical pulses with a highly non-linear optical medium in the form of two or more concatenated sections of highly non-linear optical fiber (HNLF) of different dispersion values and lengths. The two or more sections of HNLF are configured to include at least one section that exhibits a positive dispersion value and one section that exhibits a negative dispersion value. Non-linear effects such as self-phase modulation (SPM), cross-phase modulation (XPM), Raman amplification, and the like, cause the seed pulses to broaden as they propagate through each section of HNLF, where the differences between the dispersion values, as well as the (Continued)

lengths of each fiber section, are particularly configured to create an SC output that is wide and smooth, exhibiting a stable intensity and high coherence level.

13 Claims, 5 Drawing Sheets

(51) Int. Cl.
*H01S 3/067* (2006.01)
*H01S 3/16* (2006.01)

(56) References Cited

U.S. PATENT DOCUMENTS

| | | | | |
|---|---|---|---|---|
| 7,826,499 | B2* | 11/2010 | Nicholson | G02F 1/365 |
| | | | | 385/125 |
| 9,178,641 | B2* | 11/2015 | Xu | H04B 10/2563 |
| 2004/0057682 | A1* | 3/2004 | Nicholson | G02F 1/365 |
| | | | | 385/122 |
| 2005/0063655 | A1* | 3/2005 | Hebgen | G02B 6/02261 |
| | | | | 385/124 |
| 2009/0034562 | A1* | 2/2009 | Nicholson | G02F 1/365 |
| | | | | 372/6 |
| 2010/0296527 | A1* | 11/2010 | Nicholson | H01S 3/1118 |
| | | | | 372/18 |
| 2013/0011140 | A1* | 1/2013 | Xu | H04J 14/02 |
| | | | | 398/81 |
| 2013/0182724 | A1 | 7/2013 | Imeshev et al. | |
| 2015/0015938 | A1* | 1/2015 | Kieu | G02F 1/395 |
| | | | | 359/341.3 |

OTHER PUBLICATIONS

J.W. Nicholson, et al., "Pulsed and Continuous-Wave Supercontinuum Generation in Highly Nonlinear, Dispersion-Shifted Fibers", Applied Physics B: Lasers and Optics, vol. 77, No. 2-3, Sep. 1, 2003, pp. 211-218.

Hori et al., "Generation of Flatly Broadened, Wideband and Low Noise Supercontinuum by use of Highly Nonlinear Hybrid Fiber", Conference on Lasers and Electro-Optics 2004. (CLEO), US, IEEE, 2004, vol. 1, pp. 1-2.

* cited by examiner

10

10A

FIBER-BASED SUPERCONTINUUM LIGHT SOURCE

CROSS-REFERENCE TO RELATED APPLICATIONS

This application claims the benefit of U.S. Provisional Application No. 62/754,095, filed Nov. 1, 2018 and herein incorporated by reference.

TECHNICAL FIELD

The present invention relates to a supercontinuum optical source that is based upon an all-fiber arrangement, combining a seed pulse source with multiple sections of highly-nonlinear fiber (HNLF) to provide an output continuum that is stable, coherent, and exhibits a minimal variation in power spectral density across the generated continuum.

BACKGROUND OF THE INVENTION

A supercontinuum optical source typically utilizes a pulse seed laser source of sufficient intensity, with the output pulses from this source then passed through a highly non-linear optical medium (typically a highly-nonlinear optical fiber, HNLF). Many of today's HNLFs take the form of micro-structured optical fibers that are known to exhibit a relatively strong nonlinear effect. However, these specialty fibers are complex and relatively expensive, and as a result are not too amenable to standard manufacturing processes (including, for example, the simple need to fuse these micro-structured fibers to standard single-mode or multi-mode optical fiber).

Many of the goals of current supercontinuum development emphasize the aspects of increasing the generated output power, while also continuing to attempt to extend the generated spectral bandwidth of the continuum. However, power-enhanced non-linear effects can cause the created supercontinuum to exhibit variations in output power as a result of an increased level of structure. The output may also become temporally unstable, that is, display intensity variations for a given wavelength over time. Additionally, the coherence of a power-enhanced supercontinuum may begin to degrade when using an input that is too high in power, or unstable in intensity.

While free space systems are known to be less sensitive to intensity-based variations than optical systems with a relatively small optical confinement area (such as fiber-based systems), they are relatively large in size and have time-consuming installation and alignment problems that render free space systems not practical for most applications.

Without the capability to ensure the production of a supercontinuum output that is relatively smooth and stable, the ability to provide a wider bandwidth and/or higher output power may not satisfy the requirements of a given application.

SUMMARY OF THE INVENTION

The needs remaining in the prior art are addressed by the present invention, which relates to a supercontinuum optical source that is based upon an all-fiber arrangement of a fiber-based seed pulse source followed by multiple sections of highly-nonlinear fiber (HNLF) to provide an output continuum that is stable, coherent, and exhibits a minimal variation in power spectral density across the generated continuum.

In accordance with the principles of the present invention, an exemplary all-fiber supercontinuum (SC) optical source comprises a combination of a seed pulse supply of short-duration (e.g., <1 ps) pulses that exhibits a high degree of phase stability with a highly non-linear optical medium in the form of two or more concatenated sections of highly non-linear optical fiber (HNLF) of different dispersion values and lengths. The two or more sections of HNLF are configured to include at least one section that exhibits a positive dispersion value and one section that exhibits a negative dispersion value. Non-linear effects such as self-phase modulation (SPM), cross-phase modulation (XPM), Raman amplification, and the like, cause the seed pulses to broaden as they propagate through each section of HNLF, where the differences between the dispersion values, as well as the lengths of each fiber section, are particularly configured to create an SC output that is wide and smooth, exhibiting a stable intensity and high coherence level.

In contrast to many prior art arrangements, the average output power of the seed pulses is maintained at a relatively low level (e.g., about 20-40 mW), for example providing seed pulses with an energy of 1-2 nJ at a repetition rate of 4.7 MHz, sufficient to enable creation of a supercontinuum without also introducing structure and noise in its spectral range.

In situations where a selected seed pulse source is unable to provide output pulses with sufficient energy to interact within the HNLF fiber sections in the manner required for continuum generation, an SC optical source of the present invention may be formed to include a fiber-based optical amplifier that is disposed at the input to the highly non-linear optical medium and utilized to ensure that the power level of the generated seed pulses is sufficient to respond to the non-linearities in the HNLF fiber sections and create an SC output of sufficient spectral width $\Delta v$. An erbium-doped fiber amplifier (EDFA), for example, may be disposed between the output of the seed pulse supply and the input to the highly non-linear optical medium, with the parameters of the gain fiber and power of the associated pump source used to ensure that the seed pulses applied as an input to the HNLF fiber sections are at an optimum power level.

One exemplary configuration of the present invention utilizes tuning of the seed pulse power to optimize the characteristics of the SC optical output; that is, determining an optimum pulse power associated with creating a sufficiently wide spectrum while maintaining an acceptable level of noise. One tuning method useful in configurations including a doped-fiber amplifier is to adjust the pump power until the output spectrum is as wide as possible without introducing additional noise to the spectrum.

In various embodiments of the present invention, the sections of positive dispersion HNLFs are shorter than the sections of negative dispersion HNLF (perhaps as much as two orders of magnitude or so in their difference). Additionally, it is been found that optimum spectral integrity (in terms of stability, coherence and uniformity) may be obtained when the pulses first pass through a section of positive dispersion HNLF, and then through a section of negative dispersion HNLF. Other embodiments may use more than one section of positive dispersion HNLF (hereinafter P-HNLF) and more than one section of negative dispersion HNLF (N-HNLF). One configuration using multiple sections may arrange the sections in pairs of (P-, N-) dispersion (of appropriate lengths) to best control the overall shape of the generated supercontinuum.

Other aspects of the principles of the present invention incorporate the ability to perform "time stretching" at the output from the highly non-linear optical medium, creating time-separated wavelength components within each "continuum pulse" as the source output. Known dispersive Fourier transform techniques utilize time-stretched pulses in a variety of optical sensing applications, where the ability to time-stretch a continuum in accordance with the principles of the present invention is contemplated as providing a larger number of distinct wavelength components that may be used.

One exemplary embodiment of the present invention takes the form of an all-fiber optical supercontinuum source including a source of short-duration, power-limited input seed pulses, a section of single mode fiber disposed to receive the input seed pulses and provide as an output high intensity, compressed output seed pulses, and a highly non-linear optical medium coupled to the section of single mode fiber for receiving the high intensity, compressed output seed pulses. The highly non-linear optical medium itself comprises a plurality of concatenated sections of highly non-linear optical fiber including at least a first section of positive dispersion highly non-linear optical fiber (P-HNLF) and a second section of negative dispersion highly non-linear optical fiber (N-HNLF), wherein the dispersion values and lengths of the plurality of concatenated sections of highly non-linear optical fiber are selected to convert propagating high intensity, compressed output seed pulses into an optical supercontinuum output of a defined spectral bandwidth.

Another embodiment of the present invention further provides time-stretching of the generated supercontinuum by adding a specialty, highly dispersive element to the output of the highly-nonlinear optical medium.

Other and further embodiments and aspects of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

Figure 1:
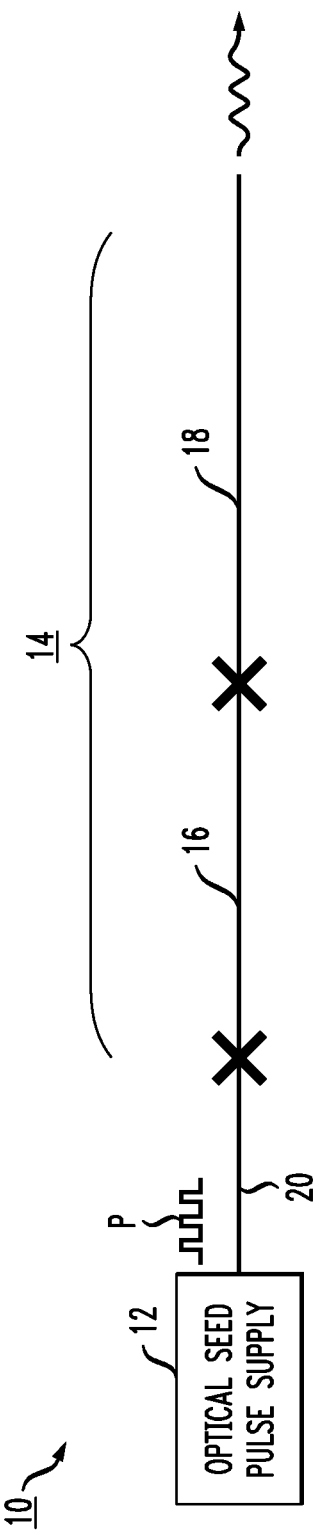
FIG. 1 is a high-level block diagram of a supercontinuum (SC) optical source formed in accordance with the principles of the present invention.

FIG. 1 contains a high-level block diagram of an exemplary supercontinuum (SC) optical source 10 formed in accordance with the principles of the present invention. SC optical source 10 is shown as comprising an optical seed pulse supply 12, providing optical pulses that are relatively short in duration (i.e., pulse duration<1 ps) and exhibit a controlled limited power level as discussed below. In exemplary embodiments, supply 12 provides a pulse train output with a pulse repetition rate of about 4.7 MHz. The pulse train output P from supply 12 is provided as an input to a highly non-linear optical medium 14 that includes at least a section of positive (anomalous) dispersion highly non-linear fiber (P-HNLF) 16 and a section of negative (normal) dispersion HNLF (N-HNLF) 18. A section of single mode optical fiber 20 is included in SC optical source 10 and disposed between the output of supply 12 and the input to highly non-linear optical medium 14. Optical fiber 20 is utilized to compress the individual seed pulses prior to passing through medium 14 so as to increase the intensity present in each pulse as it enters medium 14. The output from highly non-linear optical medium 14 is thus defined as the SC optical output of source 10.

Inasmuch as the stability of the created SC optical output is influenced by the stability of the input seed pulses, supply 12 of the present invention is selected to exhibit high coherence and a high level of phase stability (which maintaining a relatively "low" (i.e., limited) pulse energy so as not to introduce unnecessary noise). A mode-locked figure-8 laser, such as described in U.S. patent application Ser. No. 16/200,810 and assigned to the assignee of this application, is considered to be exemplary of a low-noise coherent laser source suitable for providing pulses with a high level of phase stability (i.e., a low level of pulse-to-pulse timing jitter). While this mode-locked figure-8 laser is one exemplary suitable configuration, other sources (including other fiber-based sources) may be configured to provide the necessary levels of coherence and stability.

In accordance with the principles of the present invention, preferred embodiments utilize sections of positive dispersion HNLF that are significantly shorter than the sections of negative dispersion HNLF. The arrangement as shown in FIG. 1 utilizes a highly non-linear optical medium 14 comprising a relatively short section of P-HNLF 16 combined with a relatively long section of N-HNLF 18. It is to be understood that the dispersion values attributed to the sections of HNLF are the dispersions associated with the wavelength of the propagating seed pulses (e.g., 1550 nm is a common wavelength used in these systems).

As will be discussed below, it has been found that limiting the amount of energy present in the seed pulses reduces the level of noise and instability that has been associated with prior art "high power" supercontinuum sources. As mentioned above, the seed pulses need to exhibit enough energy to be affected by the non-linear properties of the HNLF fiber sections, so in accordance with the teaching of the present invention, there is a need to find an "optimum" seed pulse energy level that is able to create an SC output of sufficient spectral width, without exhibiting the noise and structure problems associated with prior art high-power sources.

Figure 2:
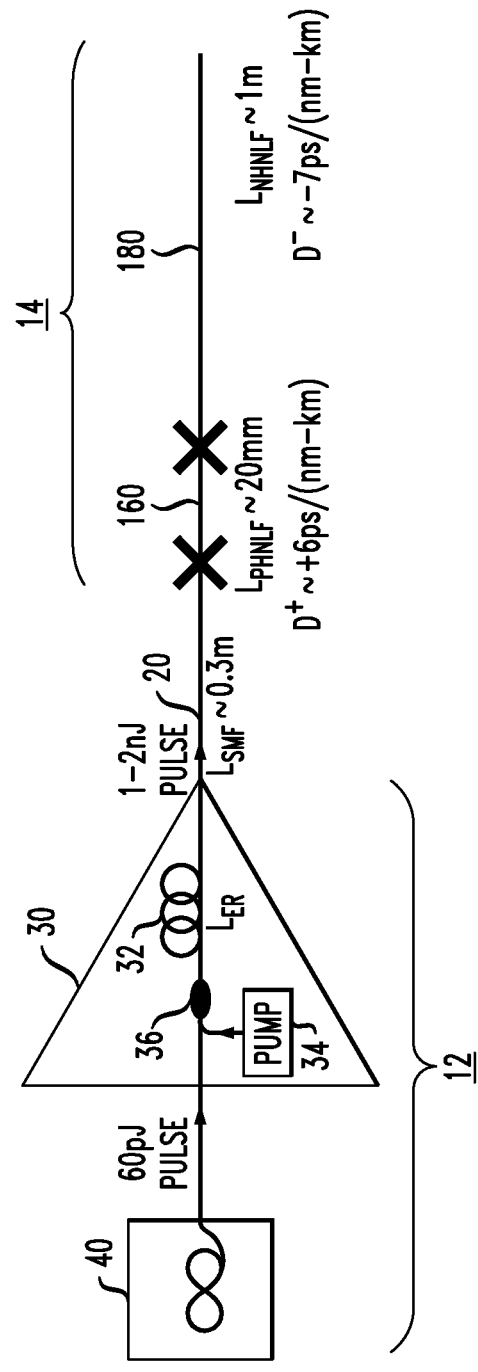
FIG. 2 illustrates an exemplary embodiment of the present invention that includes a doped-fiber amplifier to provide a controlled amount of gain to the optical pulses prior to passing through the sections of highly non-linear optical fiber (HNLF)

It is likely that most seed pulse laser sources (such as the mode-locked figure-8 fiber laser mentioned above) exhibit average output powers on the order of hundreds of µW, corresponding to a pulse energy of about 60 pJ with a repetition rate of 4.7 MHz. However, "optimum" seed pulses associated with creating sufficiently wide SC outputs typically require energy on the order of about 102 nJ. Thus, preferred embodiments of an all-fiber SC source of the present invention may require the use of an optical amplifier in conjunction with the seed pulse laser source to obtain the desired energy level for the seed pulses introduced to highly non-linear optical medium 14. FIG. 2 illustrates an exemplary embodiment of an SC optical source 10A that utilizes an erbium-doped fiber amplifier (EDFA) 30 in combination with a stable laser pulse supply 40 to create seed pulses exhibiting an optimum, limited power level suitable for the purposes of the present invention.

Stable laser pulse supply 40 may comprise a mode-locked fiber laser (e.g., a figure-8 fiber laser) to provide "seed" pulses having a pulse duration of less than 1 ps (e.g., a pulse duration of about 270 fs or so). The pulses may exhibit an average power of 300 µW at a repetition rate of 4.7 MHz (optical pulse energy of about 60 pJ). In an exemplary embodiment, this provides a peak pulse power of about 230 W for a pulse duration of 270 fs.

EDFA 30 is shown in FIG. 2 as comprising a section of erbium-doped fiber 32 (hereinafter referred to as "gain fiber") of a selected length $L_{Er}$. A pump source 34 is included as a component of EDFA 30 and provides a pump beam at an appropriate wavelength (typically, about 980 nm) and power level (e.g., in the range of about 150-300 mW). The pump beam and the seed pulse train P are combined within a wavelength division multiplexer 36 and coupled into gain fiber 32. The output from EDFA 30 thus takes the form of somewhat higher energy level seed pulses; that is, pulses with enough energy to broaden into a SC spectrum of suitable spectral width without also introducing too high a level of background noise into the spectrum. This "somewhat higher energy level" is also referred to at times herein as an "optimum" so as to differentiate from the prior art trend to utilize high-power seed pulses. In an exemplary embodiment of the present invention, gain fiber 32 may exhibit a pump beam absorption of about 27 dB/m and for this typical absorption, a length $L_{Er}$ of about 1.5 m has been found to create seed pulses with a pulse energy in the range of 1-2 nJ (which is associated with a peak pulse power in the range of 7-14 kW for a pulse duration of 150 fs).

These optimum seed pulses from EDFA 30 are shown in FIG. 2 as coupled into single mode fiber 20, which in this particular embodiment is indicated as having a length of about 0.3 m. As mentioned above, fiber 20 is utilized to compress the seed pulses (which may be more necessary in embodiments including EDFA 30) and thus increase the intensity of each pulse prior to entering highly non-linear optical medium 14.

It is to be recalled that in order to provide a suitably broad and smooth SC output spectrum, the positive dispersion HNLF component(s) of highly non-linear element 14 is(are) configured to have a length that is relatively short with respect to the length of negative dispersion HNLF component(s). In the particular embodiment shown in FIG. 2, highly non-linear element 14 comprises a single P-HNLF section 160 and a single N-HNLF section 180 that have predefined dispersion values (measured at the seed pulse wavelength) and are selected to have specific lengths so that the combination of dispersion and length creates the desired SC output spectrum. For example, P-HNLF section 160 may exhibit a dispersion +D on the order of approximately +6 ps/(nm-km) at a wavelength of 1550 nm. For this value of dispersion, P-HNLF section 160 is formed to have a length $L_{PHNLF}$ of about 20 mm. N-HNLF section 180 may exhibit a dispersion −D on the order of approximately −7 ps/(nm-km) @ 1550 nm and in this case is formed to have a length $L_{NHNLF}$ on the order of about 1 m. In a more general sense, it has been found that using sections of P-HNLF having a length less than about 0.1 m and sections of N-HNLF having a length greater than about 0.2 m are able to provide sufficient spectral broadening of short duration seed pulses having a controlled pulse energy in the range of about 1-2 nJ, as discussed above.

Figure 3:
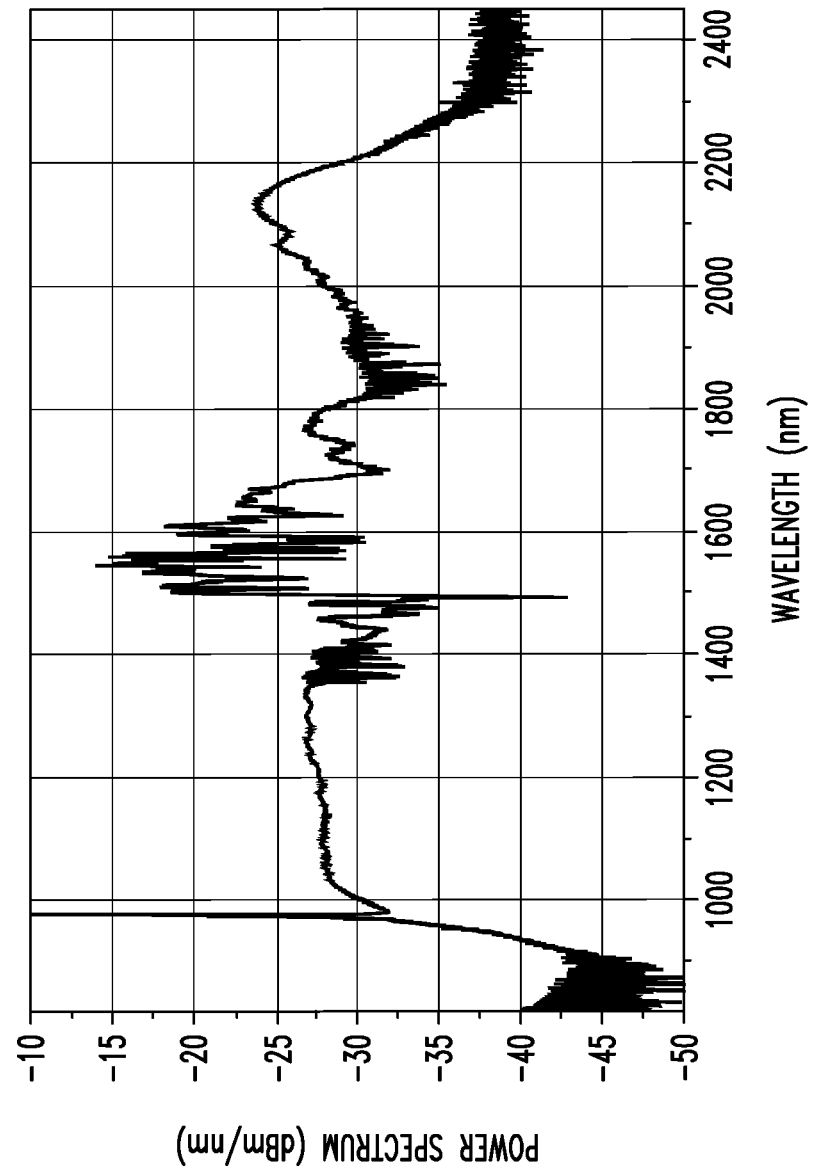
FIG. 3 shows an exemplary SC optical spectrum formed in accordance with the principles of the present invention and based on the embodiment shown in FIG. 2.

FIG. 3 illustrates an exemplary SC optical spectrum produced by SC optical source 10A of the present invention configured essentially as shown in FIG. 2. It is to be understood that while the particular values for EDFA 30 and pulse source 40 are suitable for providing an output that is sufficiently broad and smooth, other combinations of seed pulse energy level, EDFA gain (and even whether or not additional power needs to be supplied), and the dispersion/length parameters of each section of HNLF may be adjusted in an application-specific manner. Additionally, effects such as polarization mode dispersion (PMD) and changes in ambient temperature might cause the polarization state of light within non-polarization-maintaining fiber (non-PM fiber) to change and affect the output spectrum from SC light source 10. Therefore, in situations where these factors may be a concern, a configuration that is formed of polarization-maintaining fiber will significantly reduce polarization-based spectrum changes, while not otherwise impacting the specific (chromatic) dispersion used to create the SC output in the first instance.

A further aspect of the present invention is related to the ability to fine-tune the properties of the generated SC spectrum (i.e., spectral width ($\Delta v$) and variation in power spectral density (PSD)) by adjusting the input power of the seed pulses introduced to the sections of HNLF. For a particular combination of positive and negative dispersion HNLFs (and associated fiber section lengths), there will be one or more optimized seed pulse powers that create a supercontinuum having a sufficient spectral bandwidth without introducing structure and/or noise that impact the flatness of the spectral response.

Upon an initial assembly of the elements, the power level of the seed pulse input may be set at a relatively low level, with the power then increased to extend the spectral range of the generated SC output as much as possible until an unacceptable level of noise/structure begins to appear in the generated SC output spectrum. That is, in accordance with the principles of the present invention, it is possible to adjust the seed pulse power to find the "sweet spot" of sufficiently broad output without an undue level of noise. When achieved, this power level may be defined as the "optimum" seed pulse power for a specific assembly.

Figure 4:
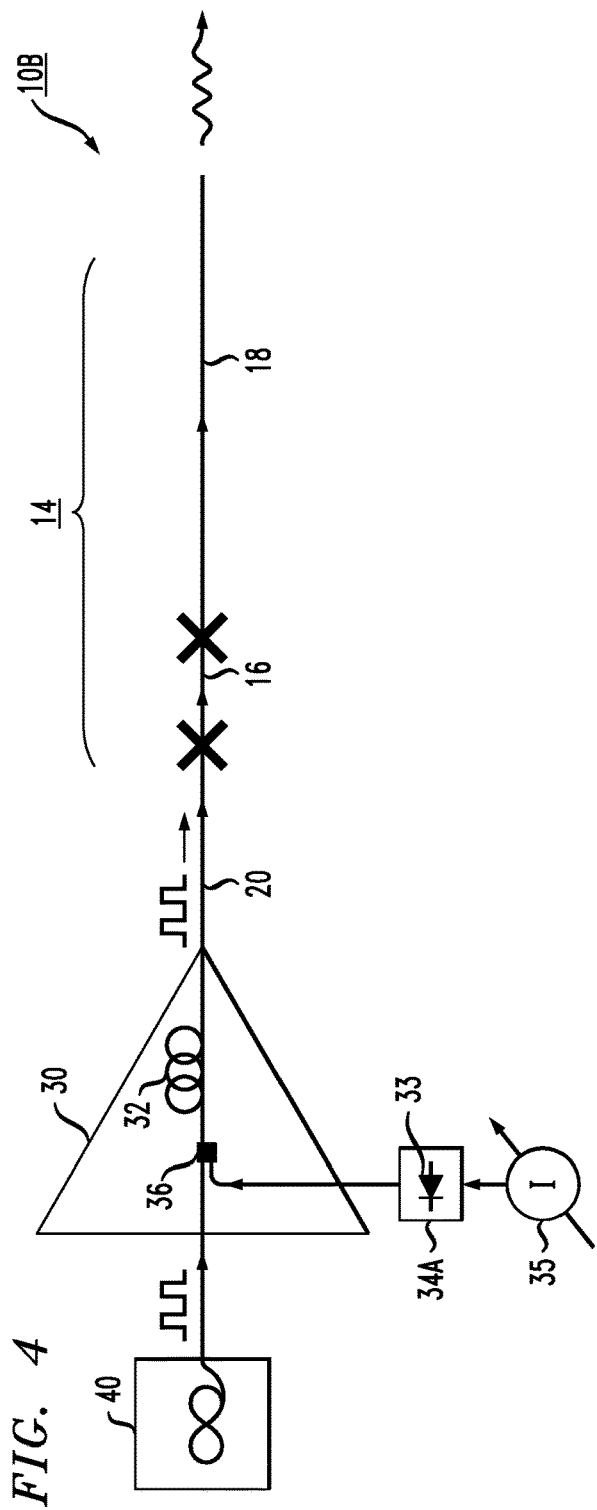
FIG. 4 depicts another embodiment of the present invention, in this case where the optical pulse power is tunable to provide an optimized SC output.

FIG. 4 illustrates an exemplary SC optical source 10B that provides the ability to adjust the seed pulse power level. As shown, SC optical source 10B includes an optical amplifier component (EDFA 30A) to supplement the output power from laser pulse source 40. Therefore, in accordance with this embodiment EDFA 30A is formed as a "tunable" optical amplifier, where the input power of pump source 34A is tuned to find the optimum seed pulse power level. In particular, pump source 34A is shown as including a laser diode 33 and a drive current source 35 used as an input to energize laser diode 33. In the particular embodiment shown in FIG. 4, drive current source 35 is adjustable, permitting the input current to be increased, thus increasing the power level of the pump beam exiting pump source 34A and thereafter applied as an input to gain fiber 32 of EDFA 30A (via WDM 36). In an exemplary embodiment, the drive current may be adjusted to tune the pump power over the range of 150-300 mW. In one particular configuration have the values shown in FIG. 2, an optimum pump power ($P_{opt}$) of 200 mW was found to provide seed pulses with an energy on the order of 1-2 nJ, exhibiting a peak pulse power in the range of about 7-14 kW (for a pulse duration of about 150 fs).

Figure 5:
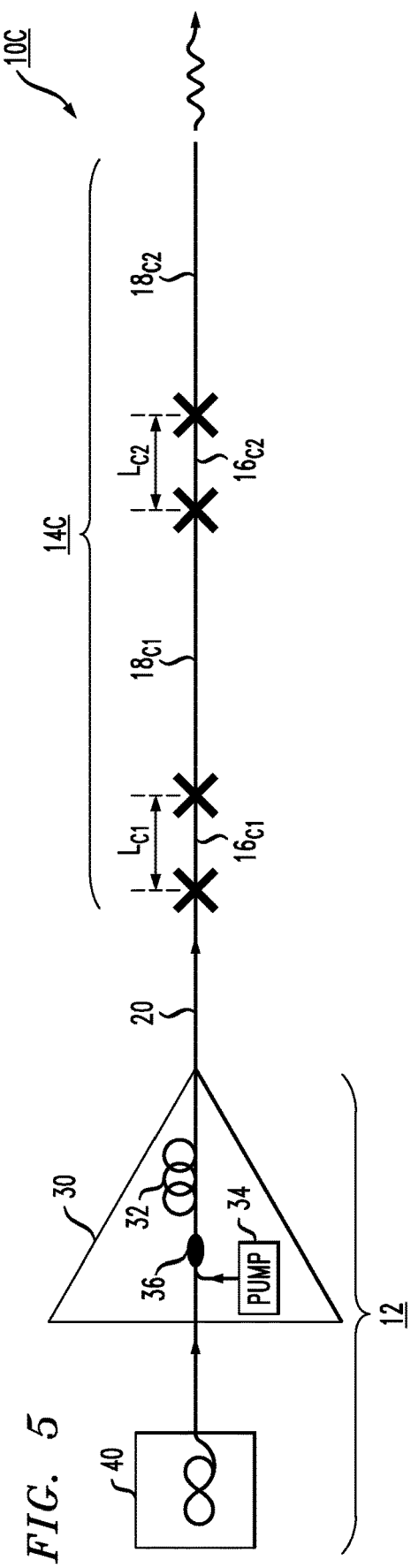
FIG. 5 shows another embodiment of the present invention, in this example utilizing multiple sections of both positive dispersion HNLF and negative dispersion HNLF.

FIG. 5 illustrates another embodiment of the present invention, where in this case an illustrated SC optical source 10C includes a highly non-linear optical medium 14C comprises a set of four sections of HNLF. In the particular embodiment as shown in FIG. 5, medium 14C consists of a first P-HNLF section $16_{C1}$ (having a first defined D+ dispersion value and formed of a first (relatively short) length $L_{C1}$), and a second P-HNLF section $16_{C2}$ (having a second defined D+ dispersion value and formed to have a second (short) length $L_{C2}$). The dispersion and length values of P-HNLF sections $16_{C1}$, $16_{C2}$ may be similar. As shown, medium 14 further comprises a pair of N-HNLF sections $18_{C1}$ and $18_{C2}$, with section $18_{C1}$ disposed between P-HNLF sections $16_{C1}$ and $16_{C2}$, and section $18_{C2}$ disposed beyond P-HNLF $16_{C2}$, and thus providing the output from SC optical source 10C. Again, the specific dispersion D− and length values of sections $18_{C1}$ and $18_{C2}$ are tailored so as to create an SC output spectrum exhibiting a sufficiently wide and smooth profile.

Another embodiment of the present invention utilizes the broad and smooth SC spectrum provided by source 10 (in any of the various embodiments as described above, or other particular configurations, as the case may be) to create a "time-stretched" output that is well-suited for use in applications such as optical coherence tomography. In particular, the generated supercontinuum is passed through a highly dispersive medium to create a "time-stretched" output. That is, an output where individual wavelength components exit the source in a spaced-apart fashion so as to allow for an associated photodetector to measure the power levels of the individual wavelengths components.

Figure 6:
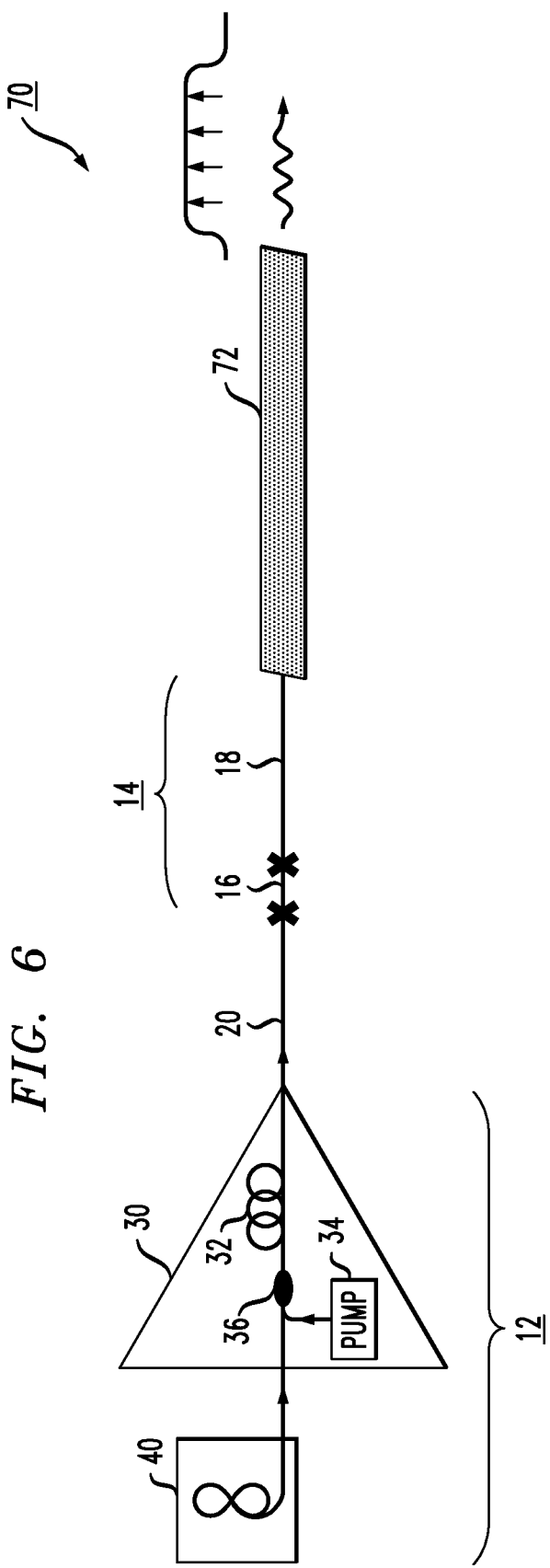
FIG. 6 shows an exemplary embodiment of the present invention that further provides "time stretching" of the SC output formed by the sections of HNLF.

FIG. 6 illustrates an exemplary all-fiber time-stretched SC source 70 as formed in accordance with the principles of the present invention to provide a time-stretched output of separate wavelength components within a given SC output as created by source 10. As shown, the SC optical output from highly non-linear optical medium 14 is used as an input to a specialty dispersive element 72. To create a time-stretched output with sufficient separation between individual wavelength components, while maintaining the stability and minimal intensity variations within the SC output spectrum as discussed above, specialty dispersive element 72 is formed to exhibit a high figure-of-merit (FOM) over the associated spectral bandwidth. For the purposes of the present invention, a "high FOM" is defined as a large ratio of dispersion to loss.

An exemplary type of specialty dispersive element suitable for this purpose is a high FOM fiber (having a dispersion with a magnitude of 75 ps/(nm-km) or greater), as described in U.S. patent application Ser. No. 15/970,900, assigned to the assignee of this application and hereby incorporated by reference. This particular specialty dispersive fiber has an FoM in the range of 75-275 ps/nm/dB for a 400 nm wide spectral range that is centered on the wavelength of 1450 nm.

In accordance with the principles of this embodiment of the present invention, as long as the pulse intensity at the input to highly non-linear optical medium 14 is maintained below the level where non-linear effects in specialty dispersive element 72 would otherwise create significant changes in stability (e.g., intensity fluctuations become too large), the input supercontinuum source noise/stability level will determine the noise-stability of the stretched output. For most applications, the parameters of the specialty dispersive element (in the case of a section of fiber, these parameters are its average dispersion D and length $L_{DF}$) should be optimized to provide a "duty cycle" close to unity. As used in accordance with the teachings of the present invention, the term "duty cycle" describes the ratio of the time interval required to "sweep" across a time-stretched output pulse from a first wavelength component to the last, to the time interval between the rising edge of adjacent time-stretched pulses (referred to as "cycle time"). A thorough discussion of this topic is found in our co-pending application Ser. No. [Westergaard 3], assigned to the assignee of this application and herein incorporated by reference.

Figure 7:
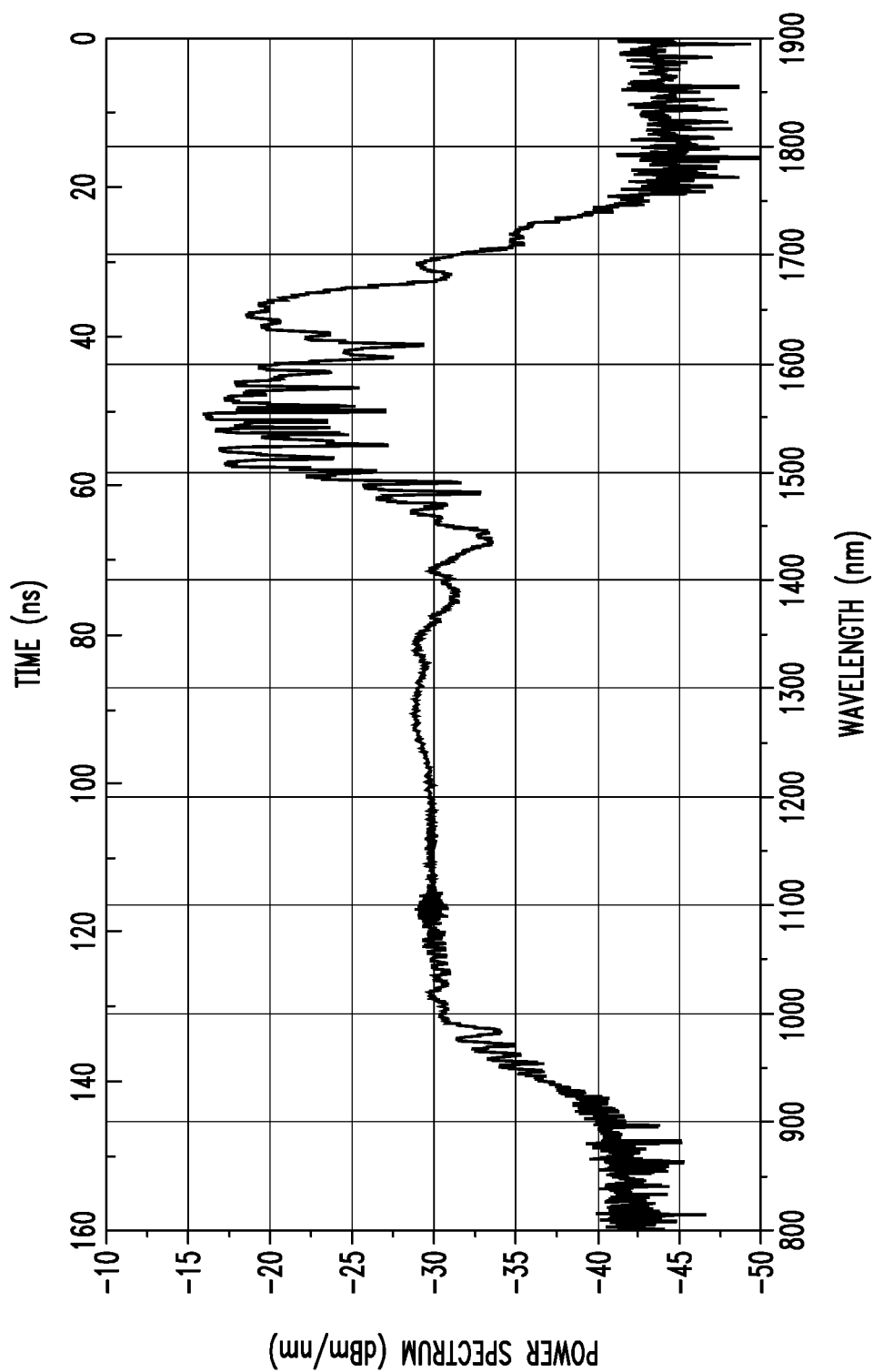
FIG. 7 is a graph of the power spectrum output from the configuration of FIG. 6.

Maintaining the same operating parameters for source 10 as discussed above in association with FIG. 2, the inclusion of specialty element 72 having a length of about 1.7 km and a positive dispersion in the range of 75-275 ps/(nm-km), was used to create the time-stretched output shown in FIG. 7. In particular, FIG. 7 is a graph of power spectrum (dBm/nm) as a function of wavelength (wavelength values shown along the bottom axis). The 'time-stretch' aspect of this plot is shown along the time axis across the top axis. In particular, the time axis is read from right to left and defines the "arrival time" of individual wavelength components at an associated photodetector.

Although the present invention has been described in terms of the presently preferred embodiments, it is to be understood that such disclosure is not be interpreted as limited to these specific configurations. Indeed, various alternatives ad modifications will no doubt become apparent to those skilled in the art after reading the above disclosure. Accordingly, it is intended that the appended claims be interpreted as covering all alternatives and modifications as fall within the spirit and scope of the present invention.

What is claimed is:

1. An all-fiber optical supercontinuum source, comprising:
a source of short-duration input seed pulses;
a section of single mode fiber disposed to receive the input seed pulses, providing high intensity, compressed output seed pulses; and
a highly non-linear optical medium coupled to the section of single mode fiber for receiving the high intensity, compressed output seed pulses, the highly non-linear optical medium comprising a plurality of concatenated sections of highly non-linear optical fiber including at least a section of positive dispersion highly non-linear optical fiber (P-HNLF) coupled at its output to a section of negative dispersion highly non-linear optical fiber (N-HNLF) where the length of the section of P-HNLF is less than the length of the section of N-HNLF, wherein the dispersion values and lengths of the plurality of concatentated sections of highly non-linear optical fiber are selected to convert propagating high intensity, compressed output seed pulses into an optical supercontinuum output of a defined spectral bandwidth.

2. The all-fiber optical supercontinuum source as defined in claim 1 wherein the source of short-duration, power-limited input seed pulses produces seed pulses having a pulse duration of less than 1 ps.

3. The all-fiber optical supercontinuum source as defined in claim 1 wherein the optical supercontinuum output exhibits a spectral of at least 300 nm, with a power variation no greater than 20 dB across the bandwidth.

4. The all-fiber optical supercontinuum source as defined in claim 1 wherein the source of short-duration, power-limited input seed pulses provides an adjustable power level, used to optimize the spectral bandwidth of the optical supercontinuum output.

5. The all-fiber optical supercontinuum source as defined in claim 1 wherein the source of short-duration, power-limited input seed pulses comprises
   a mode-locked fiber-laser for generating sub-picosecond seed pulses; and
   a doped-fiber optical amplifier coupled to the output of the mode-locked fiber-laser, the doped-fiber optical amplifier providing an optimum, limited output power for the sub-picosecond seed pulses.

6. The all-fiber supercontinuum source as defined in claim 5 wherein the doped-fiber optical amplifier comprises
   a section of rare-earth-doped gain fiber of length L;
   an optical source for providing a pump beam at a selected wavelength and exhibiting a defined power level; and
   a wavelength division multiplexer disposed at the input of the section of rare-earth-doped optical fiber, with the sub-picosecond seed pulses and the pump beam applied as inputs to the wavelength division multiplexer, and therein combined to applied together as inputs to the section of rare-earth-doped gain fiber.

7. The all-fiber supercontinuum source as defined in claim 6 wherein the gain fiber is doped with erbium, and the pump beam operates at a wavelength of about 980 nm.

8. The all-fiber supercontinuum source as defined in claim 7 wherein the pump beam power is tunable over a range of about 150 mW to about 300 mW.

9. The all-fiber supercontinuum source as defined in claim 1 wherein the highly non-linear optical medium comprises
   at least one section of P-HNLF having a dispersion of about +6 ps/nm-km and a length no greater than 10 cm, the controlled power sub-picosecond seed pulses provided as an input to a section of P-HNLF; and
   at least one section of N-HNLF, coupled to the output of the section of P-HNLF, the at least one section of N-HNLF having a dispersion of about −7 ps/nm-km and length no less than 20 cm.

10. The all-fiber supercontinuum source as defined in claim 9 wherein the at least one section of P-HNLF comprises a single section of P-HNLF, and the at least one section of N-HNLF comprises a single section of N-HNLF.

11. The all-fiber supercontinuum source as defined in claim 1 wherein the source further comprises
    a highly-dispersive fiber element coupled to the output of highly non-linear optical medium, the dispersive fiber element having a dispersion and length sufficient to provide time-stretching of each supercontinuum optical source pulse passing therethrough.

12. The all-fiber supercontinuum source as defined in claim 11 wherein the highly-dispersive fiber element comprises a section of high figure-of-merit (FOM) optical fiber.

13. The all-fiber supercontinuum source as defined in claim 1, wherein the highly non-linear optical medium comprises concatenated pairs of highly non-linear optical fiber, each pair comprising:
    a section of positive dispersion HNLF having a first length $L_{PHNLF}$; and
    a section of negative dispersion HNLF coupled to a termination of the section of positive dispersion HNLF and having a second length $L_{NHNLF}$ greater than the first length $L_{PHNLF}$,
    with the concatenated pairs arranged such that a following section of positive dispersion HNLF is coupled to an end termination of the section of negative dispersion HNLF of a previous pair, providing an arrangement of alternating positive and negative dispersion.

\* \* \* \* \*